(12) United States Patent (10) Patent No.: US 8,745,285 B2
Eguchi et al. (45) Date of Patent: Jun. 3, 2014

(54) SINK DEVICE, SOURCE DEVICE AND WIRELESS TRANSMISSION SYSTEM

(75) Inventors: Yohichi Eguchi, Osaka (JP); Keisuke Tsuji, Osaka (JP); Ryosuke Ohmae, Osaka (JP); Masayuki Etoh, Osaka (JP); Seiji Imanishi, Osaka (JP); Shinichi Katoh, Osaka (JP); Takuya Kinoshita, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 8 days.

(21) Appl. No.: 13/638,548

(22) PCT Filed: Mar. 25, 2011

(86) PCT No.: PCT/JP2011/057272
§ 371 (c)(1),
(2), (4) Date: Sep. 28, 2012

(87) PCT Pub. No.: WO2011/122456
PCT Pub. Date: Oct. 6, 2011

(65) Prior Publication Data
US 2013/0021531 A1 Jan. 24, 2013

(30) Foreign Application Priority Data
Mar. 29, 2010 (JP) .................................. 2010-075300

(51) Int. Cl.
*G06F 13/12* (2006.01)
*G06F 11/30* (2006.01)

(52) U.S. Cl.
USPC ............. 710/19; 710/2; 710/5; 710/8; 710/15

(58) Field of Classification Search
None
See application file for complete search history.

(56) References Cited

U.S. PATENT DOCUMENTS

| 6,728,231 | B1 | 4/2004 | Sugaya et al. | |
|---|---|---|---|---|
| 2009/0060220 | A1 | 3/2009 | Shiba | |
| 2009/0156051 | A1* | 6/2009 | Doyle et al. | 439/489 |
| 2011/0289545 | A1* | 11/2011 | Eguchi et al. | 725/127 |
| 2012/0020674 | A1* | 1/2012 | Cole et al. | 398/165 |

FOREIGN PATENT DOCUMENTS

| EP | 2 031 904 A2 | 3/2009 |
|---|---|---|
| EP | 2 383 996 A1 | 11/2011 |
| JP | 2005-102156 A | 4/2005 |
| JP | 2007-96971 A | 4/2007 |
| JP | 4192328 B2 | 12/2008 |
| JP | 2009-116887 A | 5/2009 |

* cited by examiner

*Primary Examiner* — Scott Sun
(74) *Attorney, Agent, or Firm* — Birch, Stewart, Kolasch & Birch, LLP

(57) ABSTRACT

Disclosed is a wireless transmission system provided with: a sink device which, when AV data transmitted by means of multicast wireless transmission from a source device is reproduced, performs reproduction control in accordance with the wireless connection state of another sink device that reproduces the AV data from the same source device; and the source device which is capable of determining the wireless connection state and the reproduction control state of the sink device. When the AV data obtained by means of multicast wireless transmission from the source device (1) is reproduced, the sink device (2a) acquires state information indicating the wireless connection state of the other sink device and adjusts reproduction control for the AV data of the actual sink device (2a) in accordance with this state information. The source device (1) acquires information on the wireless connection state and the reproduction control state of each sink device and stops or restarts transmission of the AV data on the basis of this information.

16 Claims, 16 Drawing Sheets

| TYPE OF DISCONNECTED SINK DEVICE | OPERATION |
|---|---|
| MONITOR/TV | STOP AUDIO OUTPUT IF OTHER MONITORS ARE ALSO DISCONNECTED |
| RIGHT SPEAKER | PERFORM REPRODUCTION WITH INCREASED SOUND VOLUME LEVEL IN COMBINATION WITH AUDIO FOR RIGHT SPEAKER |
| AUDIO AMPLIFIER | PERFORM REPRODUCTION WITH INCREASED SOUND VOLUME LEVEL |

FIG. 13

| GROUP IDENTIFICATION ID | SINK DEVICE IDENTIFICATION ID | SINK DEVICE TYPE | WIRELESS CONNECTION STATE |
|---|---|---|---|
| 0001 | 0001 | MONITOR/CENTER SPEAKER | FAVORABLE |
| 0001 | 0002 | FL SPEAKER | FAVORABLE |
| 0001 | 0003 | FR SPEAKER | FAVORABLE |
| 0001 | 0004 | RL SPEAKER | FAVORABLE |
| 0001 | 0005 | RR SPEAKER | FAVORABLE |
| 0002 | 0006 | MONITOR | FAVORABLE |
| 0002 | 0007 | FL SPEAKER | FAVORABLE |
| 0002 | 0008 | FR SPEAKER | DISCONNECTION |
| 0002 | 0009 | RL SPEAKER | FAVORABLE |
| 0002 | 0010 | RR SPEAKER | FAVORABLE |

FIG. 17

| SINK DEVICE IDENTIFICATION ID | SINK DEVICE TYPE | WIRELESS CONNECTION STATE | REPRODUCTION CONTROL STATE |
|---|---|---|---|
| 0001 | TV | DISCONNECTION | — |
| 0002 | MONITOR | DISCONNECTION | — |
| 0003 | AUDIO AMPLIFIER | FAVORABLE | TERMINATION |
| 0004 | L SPEAKER | FAVORABLE | TERMINATION |
| 0005 | R SPEAKER | FAVORABLE | TERMINATION |

11c

SINK DEVICE, SOURCE DEVICE AND WIRELESS TRANSMISSION SYSTEM

TECHNICAL FIELD

The present invention relates to a sink device receiving and reproducing AV (Audio Visual) data transmitted through multicast wireless transmission from a source device, a source device transmitting AV data to the sink device, and a wireless transmission system constructed of a plurality of sink devices and a source device.

BACKGROUND ART

A wireless network represented by a wireless LAN (Local Area Network) is conventionally used for data transmission between devices such as personal computers (PCs). Such a wireless network can be constructed such that data is transmitted through multicast transmission from an accesses point to devices.

Patent Document 1 discloses a wireless transmission apparatus performing wireless communication with another communication station in a wireless network. This wireless transmission apparatus includes a wireless processing means transmitting and receiving a wireless signal and a control means setting a predetermined frame period received by the wireless processing means based on management information from a surrounding communication station, defining a predetermined position within the prescribed frame period as management information transmission area, prescribing a plurality of slots in the management information transmission area to allow each communication station to transmit management information through one of the slots, prescribing a portion of the slots as a new entry slot in advance, and, when a certain signal is recognized at a predetermined new entry slot position, executing a process of allowing a transmission source of the certain signal to enter a wireless network.

PRIOR ART DOCUMENT

Patent Document

Patent Document 1: Japanese Patent Publication No. 4192328

SUMMARY OF THE INVENTION

Problem to be Solved by the Invention

Multicast transmission over the wireless is generally characterized by a transmission path configuration formed in a star shape around a transmitter and, therefore, if an individual receiver is disconnected due to fluctuations of wireless environment, other receivers are not disconnected and are capable of communication. As a result, a multicast wireless transmission system may go into a situation where some receivers are disconnected while other receivers are capable of communication.

However, such a situation is problematic in the following utilization environment. In other words, if AV data such as video and audio are transmitted through wireless multicast transmission from a source device (transmitter) such as a tuner device, the following problem occurs in such a utilization environment that combines functions of a plurality of receivers for AV viewing, such as displaying and reproducing video data in reception data by a receiver (sink device) having a video display function and outputting audio from audio data in the reception data by a receiver having an audio reproduction function. In the case of such a utilization environment, if some receivers are disconnected due to fluctuations of wireless environment, other receivers are not disconnected and are capable of communication and, as a result, a viewing environment unsatisfactory for a viewer is provided such that only audio or video is continuously reproduced when communications of some receivers are disconnected.

It is not desirable for a viewer that the receiver having the video display function continues display reproduction while audio output is stopped because the receiver having the audio reproduction function becomes unable to communicate. A similar situation may occur in a viewing environment including a receiver having a left audio reproduction function and a receiver having a right audio reproduction function when only one of the receivers is disconnected and audio output is stopped, for example. Since sound volume and sound balance are disrupted in this viewing environment, it is not desirable for a viewer to continue reproduction in such an unsatisfactory viewing environment. Although this unsatisfactory viewing environment can obviously be eliminated if a user performs a user operation such as powering off or adjusting output of all the receivers generally disposed at remote positions because wireless communication is performed, this is a very time-consuming effort.

To automatically correct such an unsatisfactory viewing environment on the receiver (sink device) side without relying on the user operation, it is desired that a sink device comprehends the wireless connection states of other sink devices. However, neither idea nor technique currently exists for allowing the comprehension of the wireless connection states of other sink devices in the utilization environment described above. Neither idea nor technique exists for automatically correcting such an unsatisfactory viewing environment on the sink device side without relying on the user operation.

If a reproducing method of AV data to be reproduced is automatically adjusted depending on the wireless connection states of other sink devices, when all the sink devices terminate reproduction due to the adjustment of the reproducing method, it is desired to terminate the multicast wireless transmission of AV data from the source device and to resume the transmission when a user is ready for viewing again. However, the source device cannot know the reproduction control states of the sink devices.

The technique described in Patent Document 1 is a technique for allowing a communication station (receiver) to newly enter an existing wireless network and is not a technique capable of solving such problems.

The present invention was conceived in view of the situations and it is therefore an object of the present invention to provide a sink device capable of determining the wireless connection states of other sink devices reproducing AV data from the same source device when reproducing the AV data transmitted through the multicast wireless transmission from the source device so as to adjust a reproduction control method of the sink device and to report the reproduction control state of the sink device to the source device, to provide a source device capable of transmitting AV data to this sink device and comprehending the wireless connection states and the AV data reproduction control states of the sink devices, and to provide a wireless transmission system including the sink devices and the source device.

Means for Solving the Problem

To solve the above problems, a first technical means of the present invention is a sink device having an AV receiving portion for receive AV data including video and/or audio that are output through multicast wireless transmission from a source device, the sink device further comprising: a reproducing portion for extracting and reproducing AV data transmitted to the sink device from the AV data received by the AV receiving portion; a device information receiving portion for receiving a part of or the whole sink device information from the source device by wireless, the sink device information being information correlating identification information for identifying a plurality of sink devices including the sink device with state information indicative of wireless connection states of the sink devices; and a transmitting portion for transmitting a reproduction control state of the sink device to the source device, wherein the reproducing portion executes a reproduction control in accordance with the state information about other sink devices received by the device information receiving portion, and the transmitting portion transmits information indicating the reproduction control state to the source device.

A second technical means is the sink device of the first technical means, wherein the transmitting portion transmits the information indicating the reproduction control state to the source device when a change occurs in the reproduction control state.

A third technical means is the sink device of the first technical means, wherein the transmitting portion transmits the information indicating the reproduction control state to the source device when requested from the source device.

A forth technical means is a source device having an AV transmitting portion for transmitting AV data including video and/or audio to sink devices through multicast wireless transmission, the source device further comprising: a connection state determining portion for determining a wireless connection state for each of a plurality of sink devices; a device information storage portion for correlating identification information preliminarily registered for identifying each of the plurality of sink devices with state information indicating wireless connection states of the sink devices determined by the connection state determining portion and storing as sink device information; a device information transmitting portion for wirelessly transmitting the sink device information stored by the device information storage portion; and a receiving portion for receiving information indicating reproduction control states of sink devices transmitted from the sink devices.

A fifth technical means is the source device of the fourth technical means, wherein if all the sink devices are in the wireless connection state of disconnection or the reproduction control state of termination, the transmission of the AV data is terminated.

A sixth technical means is the source device of the fifth technical means, wherein when a predetermined time has elapsed after the termination of the transmission of the AV data, a wireless connection state is determined for each of the plurality of the sink devices to update the sink device information, and information indicating the reproduction control states is acquired from the sink devices after the updated sink device information is transmitted to the sink devices.

A seventh technical means is the source device of the sixth technical means, wherein if the information indicating the reproduction control states of at least one of the sink devices does not indicate termination, the transmission of the AV data is resumed.

An eighth technical means is the source device of any one of the fourth to the seventh technical means, wherein the information indicating the reproduction control states is received by sending a request to the sink devices.

A ninth technical means is the source device of any one of the fourth to the seventh technical means, wherein in the sink device information, the identification information is correlated with the information indicative of the reproduction control states.

A tenth technical means is a wireless transmission system comprising: a plurality of the sink devices of the first technical means, and the source device of the fourth technical means.

Effect of the Invention

According to the present invention, the sink device can perform reproduction in accordance with the wireless connection states of other sink devices reproducing AV data from the same source device when reproducing the AV data transmitted through the multicast wireless transmission from the source device. The source device can comprehend the wireless connection states and the AV data reproduction control states of the sink devices and can control the transmission of AV data depending on the states of the sink devices.

BRIEF DESCRIPTION OF DRAWINGS

FIG. 13 is a diagram of an example of a sink list managed by a source device in the wireless transmission system of FIG. 12.

FIG. 17 is a diagram of another example of a sink list managed in the source device of FIG. 2.

MODES FOR CARRYING OUT THE INVENTION

Figure 1:
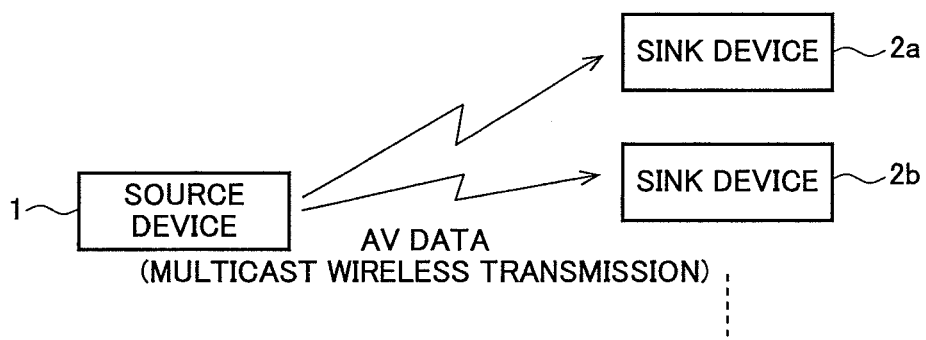
FIG. 1 is a schematic of an exemplary configuration of a wireless transmission system according to one embodiment of the present invention.

FIG. 1 is a schematic of an exemplary configuration of a wireless transmission system according to one embodiment of the present invention. The wireless transmission system (hereinafter, referred to as this system) according to this embodiment is made up of a source device 1 and a plurality of sink devices 2a, 2b, . . . (hereinafter, each referred to as "sink device 2").

The source device 1 is a device that outputs AV data including video and/or audio through the multicast wireless transmission. The sink device 2 is configured to be capable of receiving the AV data from the source device 1. Therefore, the sink device 2 includes an AV receiving portion that receives AV data transmitted through the multicast wireless transmission from the source device 1. The sink device 2 also includes a reproducing portion that extracts and reproduces AV data transmitted to the sink device 2 out of AV data received by the AV receiving portion.

The AV receiving portion receives AV data transmitted through the multicast wireless transmission and extracts data to be reproduced by the reproducing portion of the sink device 2 (data corresponding to functions of the sink device 2, e.g., an audio output function and/or a video display function). The reproducing portion may be responsible for a portion of this extraction. Multichannel audio data is generally distributed (transmitted) as an audio stream for all the channels and, in many cases, an audio output device extracts a distributed audio stream from AV data (e.g., including a video stream) regardless of where the audio output device is intended to be used, and further extracts and reproduces audio data of a channel to be reproduced from the audio stream. Describing the simplest case of two left and right channels, the right speaker also acquires the audio data for the left speaker and subsequently extracts and reproduces only the right audio data.

The sink device 2 includes a device information receiving portion. The device information receiving portion wirelessly receives a portion or whole of sink device information managed in the source device 1. Receiving only a portion means that only the information necessary for the sink device 2 is received and, if the whole information is received, the necessary information may be extracted after the reception. With regard to a receiving method, for example, the source device 1 may be configured to wirelessly transmit the sink device information in multicast or unicast periodically or at the timing of change in any piece of the sink device information, and the sink device 2 may be configured to wirelessly receive the sink device information. Alternatively, the sink device 2 and the source device 1 may be configured such that the sink device information is received in accordance with wireless data communication to the source device 1 (i.e., by periodically making a request through wireless communication to the source device 1 from the sink device 2). The device information receiving portion may be configured to share a portion of functions with the AV receiving portion.

The sink device information is information correlating identification information for identifying a plurality of the sink devices 2 including its own sink device 2, type information indicative of types of the sink devices 2, and state information indicative of the wireless connection states (wireless connection statuses) of the sink devices.

This system may use any processing methods for the addition and acquisition of the identification information, the type information, and the state information in the source device 1. For example, if the device configuration of this system is preliminarily defined, the identification information and the type information may be registered in advance. Alternatively, in view of the versatility, the type information may be acquired from the sink devices 2 through wireless communication at the time of wireless connection, and sequence numbers may be allocated as the identification information in the order of acquisition of the type information. For the state information, the source device 1 may periodically perform wireless data communication with the sink devices 2 and a sink device 2 not returning a response may be determined as not being connected (being disconnected) out of all the sink devices 2. Alternatively, the sink devices 2 may detect (determine) a reception state (reception level) of the multicast-transmitted AV data and wirelessly send the result to the source device 1, and the source device 1 may determine that a sink device 2 is not connected when the reception level detection result thereof cannot be received. To anticipate and deal with occurrence of a reproduction failure in advance, the state information may be implemented as a reception state such as a reception level of data, an error rate of data, and SNR of a signal of reception data, or a state of a power-saving mode in a sink device, and, in the case of a mobile device, a device operation state causing a reproduction failure other than wireless transmission such as a remaining amount of a battery and a load factor of an audio separating/combining portion 27.

This sink device information may be stored as a sink list formed by listing correlated pieces of the information. The information may be stored in any form such as including the type information in the identification information or adding identification information that enables interpretation of type information, for example. Although the type information is included as a portion of the sink device information in this example, the type information itself may not be managed in the source device 1 in some employable forms depending on the type and the number of the sink devices 2 included in this system.

As described above, in this system, the source device 1 manages the information (sink list) that lists the information including the wireless connection states of a plurality of the sink devices 2 to which the multicast transmission is performed. Since the device information receiving portion can actively read or passively acquire a portion or whole of the sink list, the device information receiving portion may be considered as a means for comprehending (determining) the states of other sink devices 2 linked to the source device 1.

Therefore, when reproducing AV data transmitted through the multicast wireless transmission from the source device 1, the sink device 2 of the present invention can determine and comprehend the wireless connection states of other sink devices reproducing the AV data from the same source device 1.

The wireless connection states of other sink devices comprehended in this way can be used for avoiding or restoring (correcting) an unsatisfactory viewing environment such as those generated when a portion of the sink devices is disconnected.

For such avoidance and correction, the reproducing portion performs the reproduction control depending on the state information of other sink devices received by the device information receiving portion. The reproducing portion provides the reproduction control such that the functions of the disconnected sink device 2 is compensated depending on the individual characteristics (functions) of all the connected sink devices 2 and the characteristics (functions) of the disconnected sink device 2 among them. For example, when the device information receiving portion receives the state information of other sink devices, if the state information of any other sink device 2 indicates the wireless disconnection state, the current reproduction control is changed to compensate the termination of output of the sink device in the wireless disconnection state or to coordinate with the termination of the output so as to avoid or correct an unsatisfactory viewing environment. On the other hand, if the state information of all the other sink devices indicates being in wireless communication (favorable sensitivity), the current reproduction control is continued without change.

Describing the simplest example, in a system made up of a music player (source device) and left and right speakers (sink devices), if the right speaker detects that the communication with the left speaker is disconnected based on a sink list in the music player, the right speaker reproduces not only the normal right-speaker audio data but also the left-speaker audio data in a combined manner or reproduces the right-speaker audio data with an increased sound volume.

As described above, by providing the reproduction control depending on the state information in the sink device 2 (e.g., sink device 2a), when AV data transmitted from the source device 1 through the multicast wireless transmission is reproduced, the reproduction can be performed in accordance with the wireless connection states of other sink devices 2 (e.g., sink devices other than the sink device 2a) reproducing the AV data from the same source device 1.

In this system, the source device 1 does not have the control right of the reproduction control. If the control right is given to the source device 1, the control of the source device 1 is complicated since all the functions of a plurality of the sink devices 2 must be comprehended, and the functions of the sink devices 2 added later must also be implemented in advance in the source device 1, which makes mounting on an actual product difficult. It also becomes necessary for a company selling the source device 1 to publish the sink list of the sink devices 2 belonging to the source device 1 to the outside for other companies developing the sink devices 2. Such problems do not occur in this system. However, implementation of a source device including functions of sink devices is conceivable, such as a television having a video reproduction device for Blu-ray discs etc., or a source device having a function of directly receiving a control signal from a remote controller.

Various examples will hereinafter be described for the reproduction control performed by the reproducing portion in accordance with the state information with reference to one specific exemplary configuration related to the source device 1 and the sink device 2.

Figure 2:
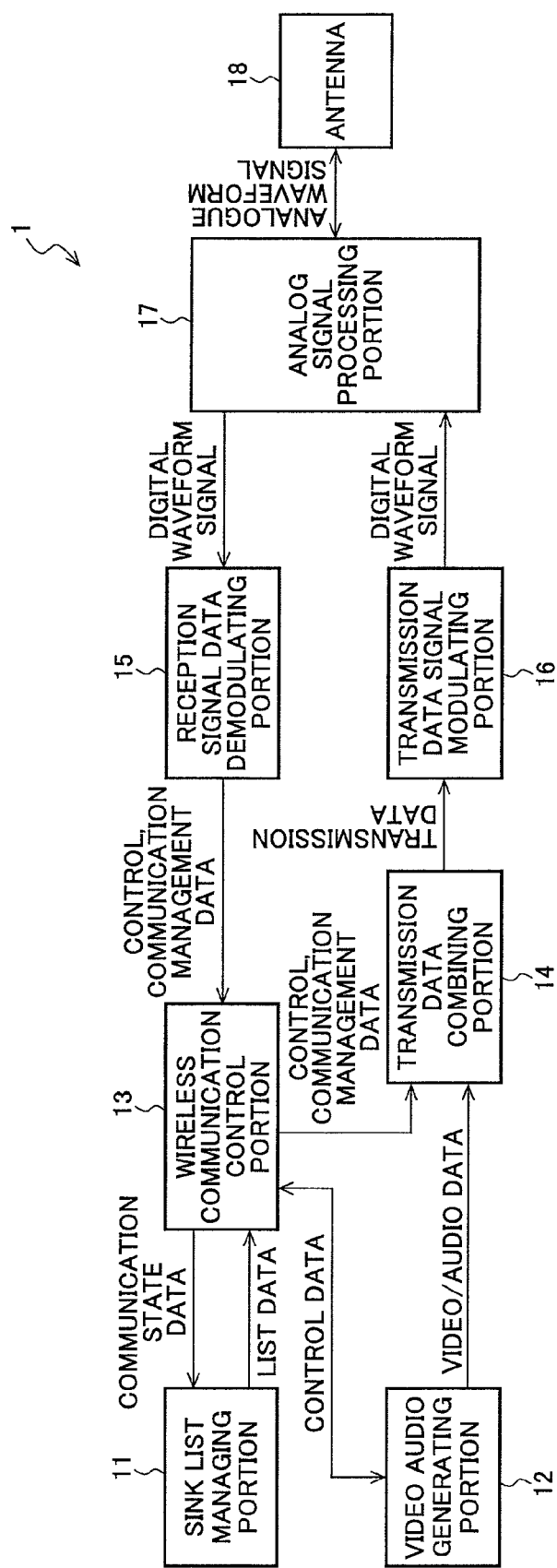
FIG. 2 is a functional block diagram of one exemplary configuration of a source device in the wireless transmission system of FIG. 1.
Figure 3:
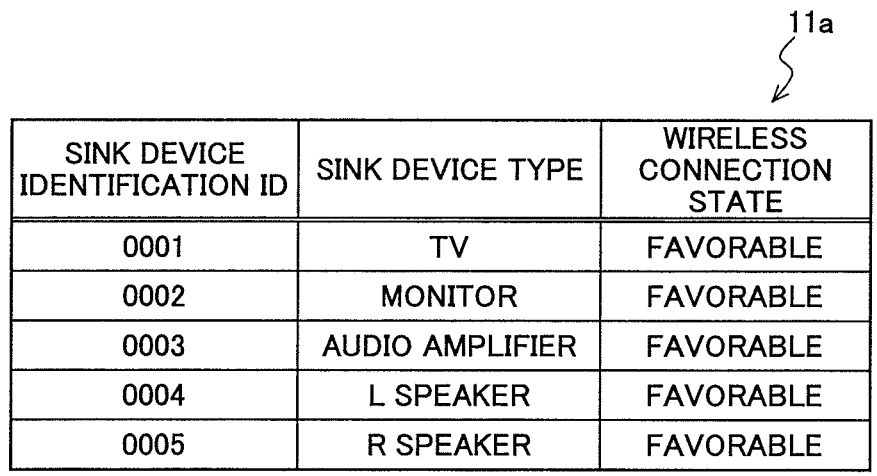
FIG. 3 is a diagram of an example of a sink list managed in the source device of FIG. 2.
Figure 4:
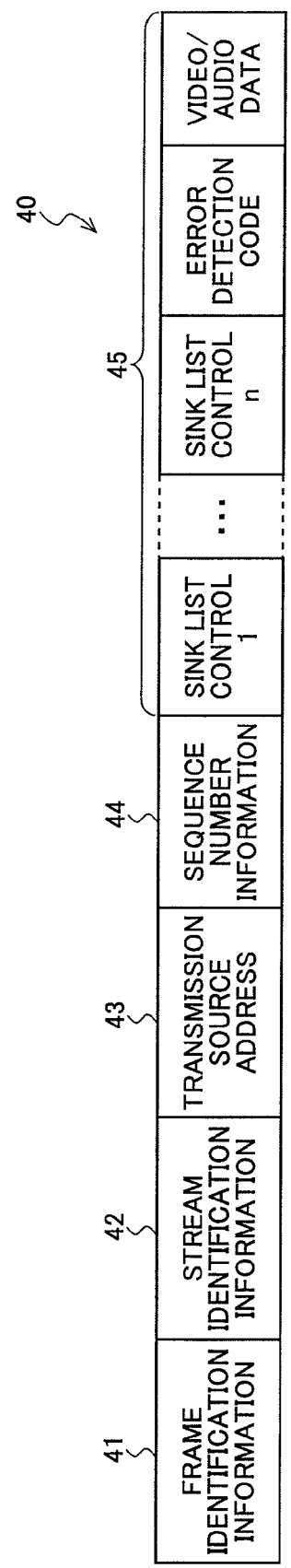
FIG. 4 is a diagram of an example of a format of a frame multicast-transmitted from the source device of FIG. 2 to sink devices.
Figure 5:
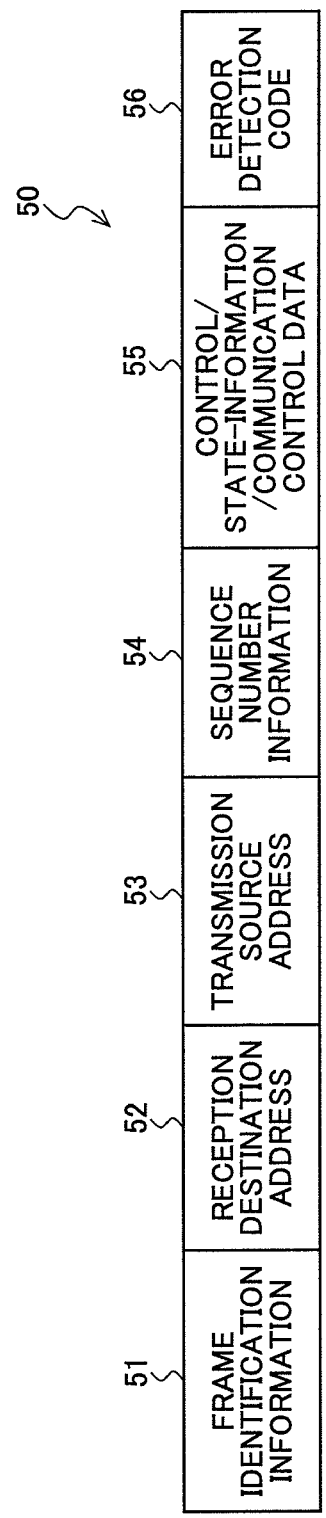
FIG. 5 is a diagram of an example of a format of a frame that is unicast-transmitted between the source device of FIG. 2 and a sink device.

FIG. 2 is a functional block diagram of one exemplary configuration of a source device in the wireless transmission system of FIG. 1. FIG. 3 is a diagram of an example of a sink list managed in the source device of FIG. 2; FIG. 4 is a diagram of an example of a format of a frame multicast-transmitted from the source device of FIG. 2 to sink devices; and FIG. 5 is a diagram of an example of a format of a frame that is unicast-transmitted between the source device of FIG. 2 and a sink device.

The source device 1 exemplarily illustrated in FIG. 2 includes a sink list managing portion 11, a video audio generating portion 12, a wireless communication control portion 13, a transmission data combining portion 14, a reception signal data demodulating portion 15, a transmission data signal modulating portion 16, an analogue signal processing portion 17, and an antenna 18.

The video audio generating portion 12 generates video/audio data. If the source device 1 is STB (set top box), a recorder, etc., having a tuner portion connected to a broadcast reception antenna or a broadcast reception cable, the video audio generating portion 12 may be configured to perform demodulation, decoding, etc., of received broadcast signals. If the source device 1 is a recorder, a player, etc., the video audio generating portion 12 may be configured to read video/audio data from a recording location, for example, and to perform decoding etc., as needed.

The video audio generating portion 12 receives control data (such as a control command for reproduction, pause, etc.) from the sink device 2 via the wireless communication control portion 13 and performs operations corresponding to the control data. If the sink device 2 is TV etc., the control command may be a command transmitted from TV based on a CEC (Consumer Electronics Control) command in the HDMI (High-Definition Multimedia Interface) standard.

The wireless communication control portion 13 controls wireless communication. The wireless communication control portion 13 performs generation/transmission and reception/determination of communication management data related to the wireless communication and performs processing/control for establishing the network configuration and the wireless communication. The wireless communication control portion 13 also performs transmission management of control data that must certainly be transferred (such as management of retransmission processing).

The sink list managing portion 11 stores and manages the sink list, which is a list of the sink devices 2. For example, the sink list managing portion 11 acquires information indicative of the communication states of the sink devices 2 from the wireless communication control portion 13 and retains the wireless connection states of the sink devices 2 as the sink list. The sink list managing portion 11 provides the wireless communication control portion 13 with a portion or whole of the sink list distributed to the sink devices 2.

A sink list 11a exemplarily illustrated in FIG. 3 retains sink device identification IDs, sink device types (such as television, monitor, audio amplifier, Lch speaker, and Rch speaker), and wireless connection states (favorable/disconnected) as examples of respective data items of the identification information, the type information, and the state information.

The transmission data combining portion 14 combines the video/audio data with the control data and the communication management data received from the wireless communication control portion 13 and gives the data to the transmission data signal modulating portion 16. The transmission data signal modulating portion 16 executes a modulation process for the transmission data to generate and give a transmission digital waveform signal to the analogue signal processing portion 17. The analogue signal processing portion 17 performs mutual conversion between a digital waveform signal and an analog waveform signal. The antenna 18 transmits/receives electric waves to/from the sink devices 2. The reception signal data demodulating portion 15 demodulates the control data and the communication management data from the reception digital waveform signal subjected to the A/D conversion by the analogue signal processing portion 17 and gives the data to the wireless communication control portion 13.

A transmission frame 40 exemplarily illustrated in FIG. 4 is a frame multicast-transmitted from the antenna 18 (frame of multicast data packet) for video/audio transmission. The transmission frame 40 is made up of fields such as frame identification information 41, stream identification information 42, a transmission source address 43, sequence number information 44, and transmission data 45. The transmission data 45 includes sink list controls 1 to n, an error detection code, and video/audio data.

The frame identification information 41 is information specifying a type of data. Since only three types of data exist in the examples described herein (FIG. 4 and FIGS. 5 and 14 described later), it is sufficient if the frame identification information 41 can distinguish three types; however, the identification information is generally distinguished in accordance with a purpose of control (such as data communication, management, band reservation, and acknowledgement) in wireless LAN, for example.

The stream identification information 42 is identification information for identifying video/audio data. The stream identification information 42 is useful when one source device 1 sends a plurality of streams. The transmission source address 43 indicates the address of the source device 1 that is the transmission source. Although the sequence number information 44 can be used for determining duplication in the case of communication including a retransmission process or used by a receiver (the sink device 2) for detecting that a number is skipped in the case of communication not including a retransmission process, the sequence number information 44 may not be included in the frame format without problems.

The sink list controls 1 to n include the sink device types and the wireless communication states corresponding to the sink device identification IDs (1 to n) of the sink list, and a control command for concurrently controlling the sink devices 2. Each of the sink devices 2 may extract the state information (wireless connection state) of the sink device 2 changed in the reproduction control depending on the wireless connection states of other sink devices 2 (the sink devices 2 of the types changed in the reproduction control). This control command and a process example using the control command will be described later.

The error detection code is data for determining whether transmission data has an error, such as CRC (cyclic redundancy check). The video/audio data includes data of video and data of audio. Each of the sink devices 2 may extract data necessary for reproduction, for example, audio data, from the video/audio data.

A transmission frame 50 exemplarily illustrated in FIG. 5 is a frame unicast-transmitted from the source device 1 or the sink device 2 (frame of unicast data packet) for transmission of control data and communication control data. The transmission frame 50 is made up of fields such as frame identification information 51, a reception destination address 52, a transmission source address 53, sequence number information 54, control/state-information/communication control data 55, and an error detection code 56.

The frame identification information 51, the transmission source address 53, the sequence number information 54, and the error detection code 56 are as described with the transmission frame 40 of FIG. 4. Since the transmission frame 50 is a frame for the unicast transmission and is available for retransmission, the sequence number information 54 is necessary. The reception destination address 52 indicates an address of a terminal on the reception side (the sink device 2 when the source device 1 is on the transmission side or the source device 1 when the sink device 2 is on the transmission side). The control/state-information/communication control data 55 includes control data, information of the wireless connection state of the sink device 2 supplied to the source device 1 (when the sink device 2 is on the transmission side), and communication control data (communication control data is necessary if management of network formation etc., are performed).

Figure 6:
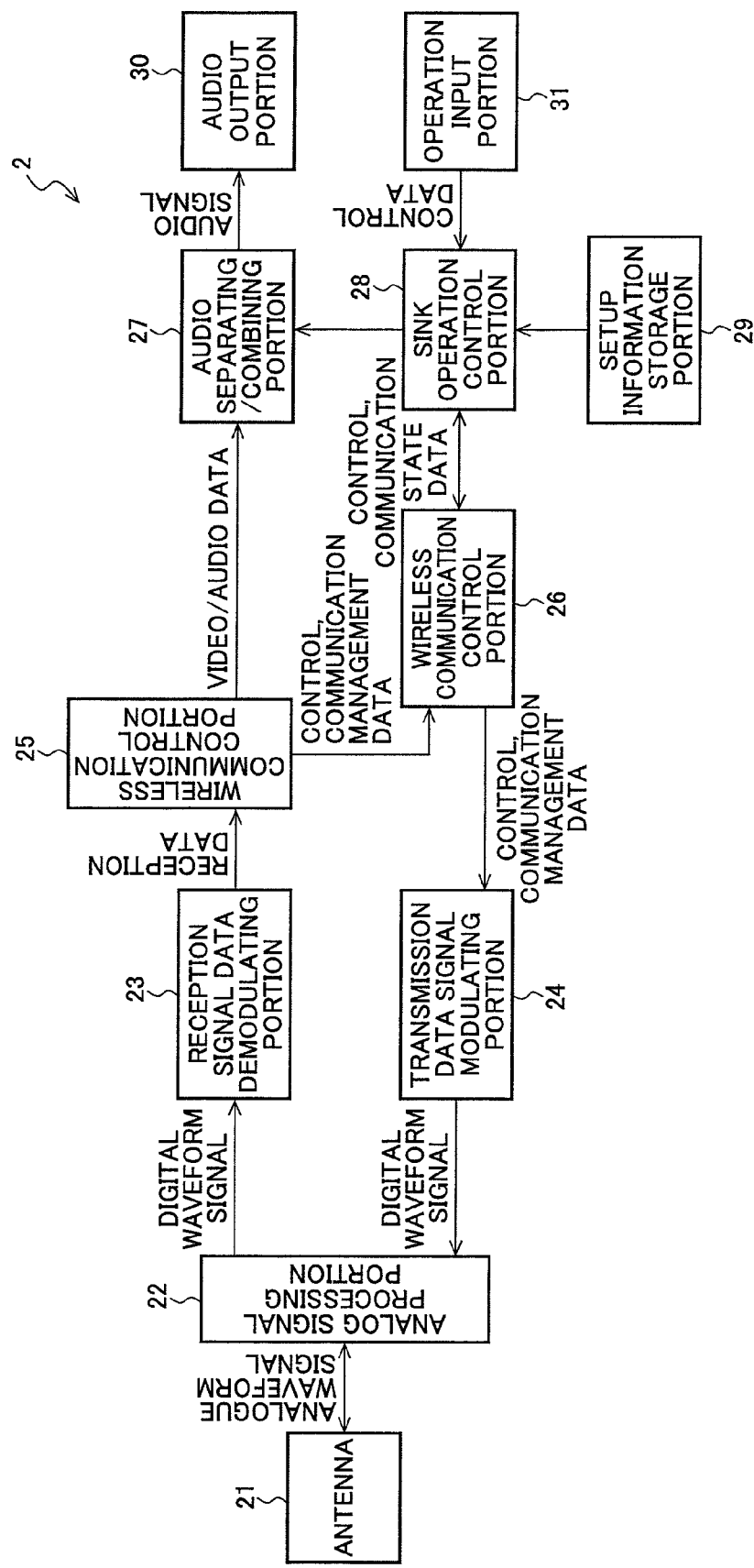
FIG. 6 is a functional block diagram of one exemplary configuration of a sink device in the wireless transmission system of FIG. 1.
Figures 7, 8:
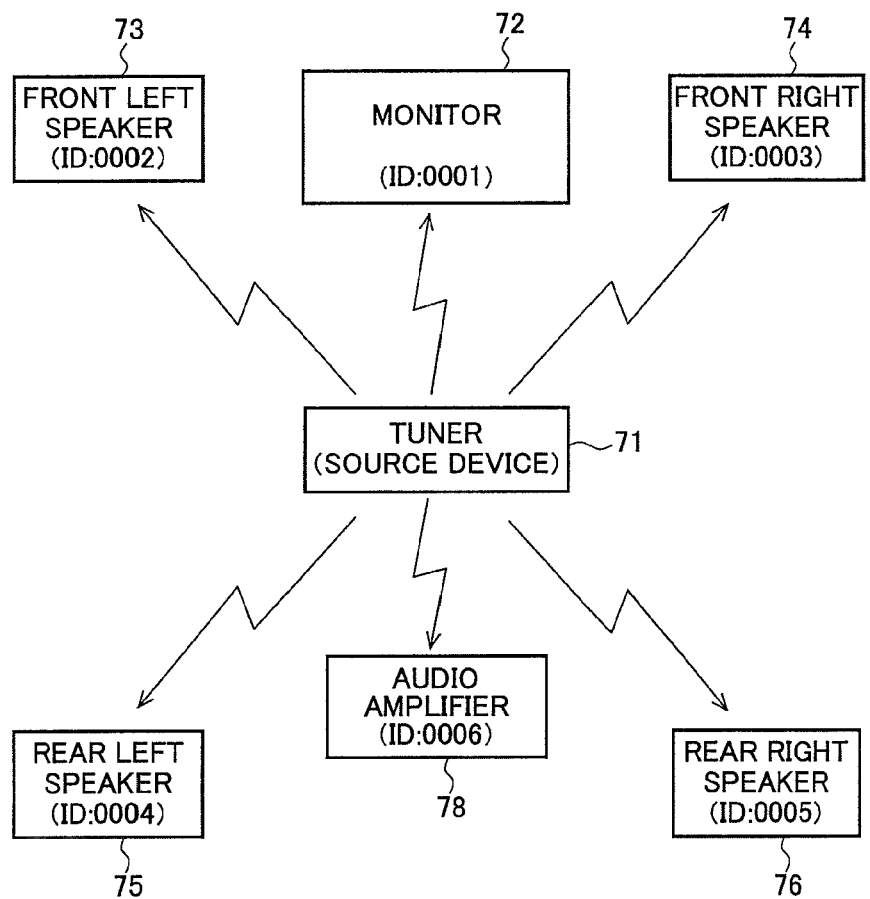
FIG. 7 is a diagram of an example of an operation table set in the sink device of FIG. 6.
FIG. 8 is a diagram of an exemplary construction of the wireless transmission system of FIG. 1.

FIG. 6 is a functional block diagram of one exemplary configuration of a sink device in the wireless transmission system of FIG. 1 and FIG. 7 is a diagram of an example of an operation table set in the sink device of FIG. 6.

The sink device 2 exemplarily illustrated in FIG. 6 includes an antenna 21, an analogue signal processing portion 22, a reception signal data demodulating portion 23, a transmission data signal modulating portion 24, a reception data separating portion 25, a wireless communication control portion 26, an audio separating/combining portion 27, a sink operation control portion 28, a setup information storage portion 29, an audio output portion 30, and an operation input portion 31. The AV receiving portion can exemplarily be illustrated by the elements 21, 22, 23, 24, 27, 28, etc.; the device information receiving portion can exemplarily be illustrated by the elements 21 to 23, 25, 26, 28, etc.; and the reproducing portion can exemplarily be illustrated by the elements 27 to 30, etc.

The antenna 21 transmits/receives electric waves to/from the source device 1. The analogue signal processing portion 22 performs mutual conversion between a digital waveform signal and an analog waveform signal. The reception signal data demodulating portion 23 demodulates reception data from the reception digital waveform signal subjected to the A/D conversion by the analogue signal processing portion 22 and gives the reception data to the reception data separating portion 25. The reception data separating portion 25 separates the video/audio data as well as the control data and the communication management data from the reception data and gives the video/audio data to the audio separating/combining portion 27 and the control data and the communication management data to the wireless communication control portion 26.

The wireless communication control portion 26 controls wireless communication. The wireless communication control portion 26 performs generation/transmission and reception/determination of communication management data related to the wireless communication and performs processing/control for establishing the network configuration and the wireless communication. The wireless communication control portion 26 also performs transmission management of control data that must certainly be transferred (such as management of retransmission processing). In the case of the configuration of sending the state information to the source device 1, the wireless communication control portion 26 generates and wirelessly transmits information of the communication state of the sink device 2 to be registered in the sink list in the source device 1.

The audio separating/combining portion 27 takes out data corresponding to its own role (such as L/R and rear/front of speakers) from the audio/video data and gives the data to the audio output portion 30. The audio separating/combining portion 27 performs the audio combining, the sound volume adjustment, etc., in accordance with instructions from the sink operation control portion 28 described later.

The audio output portion 30 outputs audio. Although an audio reproducing device is described as the sink device 2 in this example, the sink device 2 includes a video output portion (video displaying portion) instead of the audio output portion 30 in the case of a video reproducing device such as a monitor and includes a video output portion (video displaying portion) together with the audio output portion 30 in the case of a video audio reproducing device such as a TV.

The operation input portion 31 receives control data (such as a control command for reproduction, pause, etc.) from a user, etc. The control command may be a command transmitted from the source device 1 based on a CEC (Consumer Electronics Control) command in the HDMI (High-Definition Multimedia Interface) standard.

The transmission data signal modulating portion 24 executes a modulation process for the control data and the communication management data and generates and gives a transmission digital waveform signal to the analogue signal processing portion 22 to transmit electric waves through the antenna 21.

The sink operation control portion 28 instructs an operation of the sink device 2 in accordance with a sink device type and the wireless connection state received as a portion or whole of the sink list from the source device 1, the setup information set as operations corresponding thereto in advance, and the control data (received as an intra-sink-list control command described later) from the operation input portion 31. The setup information storage portion 29 stores the role of the sink device 2, the corresponding operations, and the conditions of performing the corresponding operations.

The operations may be stored as an operation table 29a exemplarily illustrated in FIG. 7, for example. The operation table 29a is an example of the operation table when this system is a wireless home theater system equipped with a tuner device as the source device 1, a monitor or TV, a right speaker device, a left speaker device, and an audio amplifier as the sink devices 2 and the operation table is stored in the setup information storage portion 29 of the left speaker device. The audio amplifier is disposed stand-alone as a front speaker or disposed along with another speaker device wired to the audio amplifier. The sink devices other than the left speaker device may normally retain operation tables different from the operation table 29a corresponding to the operations of the sink devices in the setup information storage portions 29 thereof. It is also conceivable to configure the operation table such that a common operation table having descriptions encompassing the operations of all the sink devices is set for all the sink devices without setting different operation tables to determine the corresponding operations in accordance with information on the roles of the sink devices in the setup information storage portions.

The sink operation control portion 28 of the left speaker device determines a type of sink device (sink device other than the left speaker device) entailing a change in its own operation at the time of disconnection from the operation table 29a, acquires the wireless connection state of the type from the sink list, and controls the portions to perform the operation defined in the operation table 29a depending on the disconnected sink device. The priority order may be added to the operation table 29a or the operation table 29a may be described in the order of priority to provide the determination/reproduction control based on the priority order.

In this example, if the monitor or TV (monitor+center speaker) is disconnected, audio output is controlled to stop only when the other monitors are also disconnected. When the monitor/TV is not disconnected, it is determined whether the right speaker device is disconnected and, if disconnected, the audio for the right speaker is combined and output with the audio for the left speaker, which is normally reproduced by the left speaker device. In this case, since one speaker cannot cover the same sound volume level, a sound volume level may be increased. Similarly, when the monitor/TV is not disconnected, it is determined whether the audio amplifier is disconnected and, if disconnected, the reproduction is performed with an increased sound volume level (in this case, the right speaker device also increase a sound volume level through the same control). In the case of the disconnection of the audio amplifier, the operation may also be set such that the audio for the audio amplifier is combined and output with the audio for the left speaker, which is normally reproduced by the left speaker device.

As exemplarily illustrated by the reproduction control in the left speaker device at the time of disconnection of the right speaker device, the reproducing portion preferably provides the reproduction control depending on the type information and the state information by adding and reproducing the AV data extracted to be reproduced, in accordance with the type information and the state information of other sink devices received by the device information receiving portion.

As exemplarily illustrated by the reproduction control in the left speaker device at the time of disconnection of the right speaker device, the reproducing portion provides the reproduction control depending on the type information and the state information by adjusting a reproducing method of the AV data to be reproduced, in accordance with the type information and the state information of other sink devices 2 received by the device information receiving portion. The reproducing method represents a reproduction level (output level, which is a sound volume level in this example) and a reproduction balance disrupted due to disconnection of other sink devices 2. To adjust the reproduction balance, preferably, AV data extracted to be reproduced is added as described above.

As exemplarily illustrated by the reproduction control in the left speaker device at the time of disconnection of the monitor/TV, the reproducing portion preferably provides the reproduction control depending on the type information and the state information by terminating the reproduction, in accordance with the type information and the state information of other sink devices 2 received by the device information receiving portion. Although this termination can be performed along with the adjustment of the reproducing method and the addition of AV data extracted to be reproduced as described above, the termination may not be performed if the disconnected sink device 2 is a device of the same type (determinable from the type information) and the termination may be prioritized if all the devices of a different type are disconnected, depending on the type (video/audio) of the sink device 2.

If a portion of the sink devices 2 is in the wireless connection state and all the sink devices 2 do not perform reproduction due to the action of the termination, the source device 1 may also terminate the multicast wireless transmission of AV data and resume the transmission after a predetermined time period. The operations of the sing devices and the source device in this case will be described later.

Although the example described above and other examples described later are basically described on the basis that the reproducing portion provides the reproduction control depending on the type information and the state information, the type information may not be referenced or used. For example, since all the sink devices are limited to speaker devices and amplifier devices in the case of a music player etc., and since the availability of communication can be comprehended from the fact that the sink list can be received and the disconnection of another sink device can be comprehended if disconnection exists in the sink list, the reproduction control depending on the state information (e.g., simply increasing a sound volume level) can be performed without problems.

Figure 9:
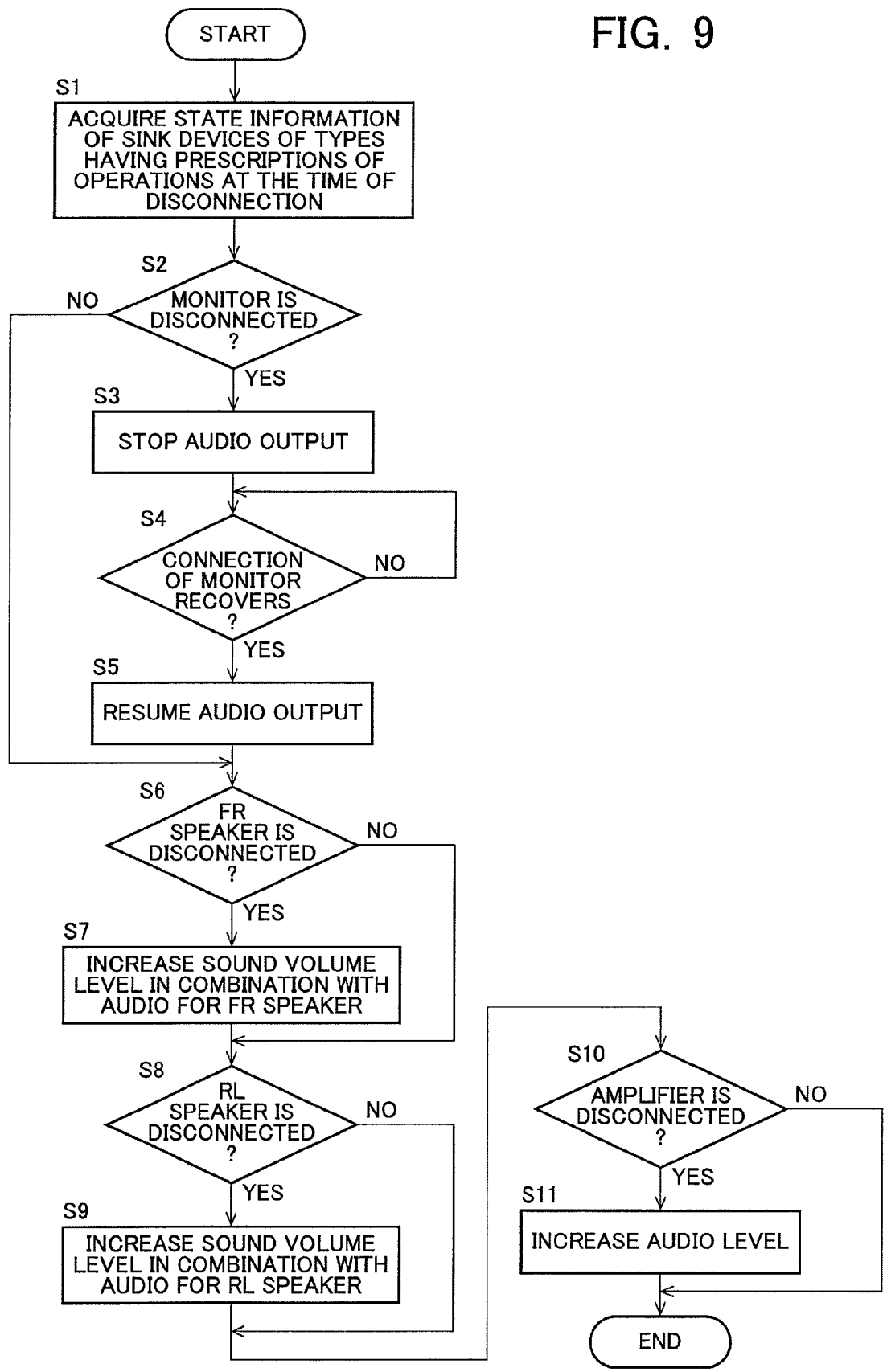
FIG. 9 is a flowchart for explaining an operational example of a front left speaker in the wireless transmission system of FIG. 8.

FIG. 8 is a diagram of an exemplary construction of the wireless transmission system of FIG. 1 and FIG. 9 is a flowchart for explaining an operational example of a front left speaker in the wireless transmission system of FIG. 8. The system of FIG. 8 is constructed of a tuner 71 and a sink device group consisting of a monitor 72 (ID: 0001), a front left speaker device 73 (ID: 0002), a front right speaker device 74 (ID: 0003), a rear left speaker device 75 (ID: 0004), a rear right speaker device 76 (ID: 0005), and an audio amplifier 78 (ID: 0006). If all the sink devices favorably communicate, a surround system can be made up of the speaker devices 73 to 76 and the audio amplifier 78. The IDs represent correlation with sink device identification IDs in a sink list.

If wireless transmission is disconnected between one of the surround speakers, for example, the front right speaker device 74 and the tuner 71 due to wireless disturbance in this system, other surround speaker devices 73, 75, 76, and 78 comprehend the wireless disconnection state of the front right speaker device 74 from the sink list of the source device 1 and automatically adjust a sound balance and a sound volume level to compensate the absence of the front right speaker device 74.

Although an operational example of the front left speaker device 73 (for audio reproduction of the front left channel) will be mainly described, other sink devices also perform operations tailored to the functions of the devices in the same way. The following control is mainly provided by the sink operation control portion 28 of FIG. 6 with reference to the setup information storage portion 29 in the speaker device 73.

First, the front left speaker device 73 acquires the state information of sink devices of types having prescriptions of operations at the time of disconnection from an operation table like the operation table 29a of FIG. 7 from the source device 1 (step S1). In the case of this system, the operation table in the front left speaker device 73 is assumed to prescribe the operations related to the monitor and the audio amplifier in the operation table 29a, the operation of increasing a sound volume level in combination with audio of a channel for a front right speaker device (the device 74, which, however, is not particularly necessary to be recorded in the device 73 and can be determined from the type information of the sink list; the same applies to the following description) at the time of disconnection of the front right speaker device, and the operation of increasing a sound volume level in combination with audio of a channel for a rear left speaker device (corresponding to the device 75) at the time of disconnection of the rear left speaker device. It is assumed that the operation at the time of disconnection of a rear right speaker device (corresponding to the device 76) is not prescribed.

Following step S1, the speaker device 73 determines whether the monitor 72 is disconnected (step S2), stops the audio output if YES (step S3), and goes to step S6 if NO. Following step S3, the speaker device 73 waits for the timing of the sink list acquisition and determines whether the connection of the monitor 72 recovers (restitutes) (step S4), and resumes the audio output after waiting the recovery (step S5). The process of steps S2 to S5 can prevent an unsatisfactory viewing environment such as continuously outputting only audio while video is terminated due to wireless disturbance.

Following step S5, the speaker device 73 determines whether the front right speaker device 74 is disconnected (step S6) and, only in the case of YES, the speaker device 73 combines the audio of the front right channel for the speaker device 74 with the original audio of the front left channel and performs reproduction with an increased sound volume level (step S7). The same operation is subsequently performed for the rear left speaker device 75 (steps S8 and S9). The speaker device 73 then determines whether the audio amplifier 78 is disconnected (step S10) and, only in the case of YES, the speaker device 73 reproduces the original audio of the front left channel with an increased sound volume level (step S11).

As described above, if a system uses AV data including multichannel audio data and includes sink devices that are audio output devices (speaker devices or amplifier devices or speaker devices attached to a monitor) performing the audio output of audio data of predetermined channels with the reproducing portions, the reproducing portions preferably provide the reproduction control depending on the state information and the channel information of the sink devices, which are other audio output devices, received by the device information receiving portions, as the reproduction control. In this case, it is assumed that the type information includes channel information indicative of channels of audio output for sink devices that are audio output devices among the sink devices. The process of steps S6 to S11 can prevent the sound balance and the sound volume level from being extremely disrupted due to wireless disturbance. The process of steps S6 to S11 may basically be executed each time the sink list is acquired. The determination and the process related to the recovery of the speaker devices 74 and 75 from disconnection will not be described.

Figure 10:
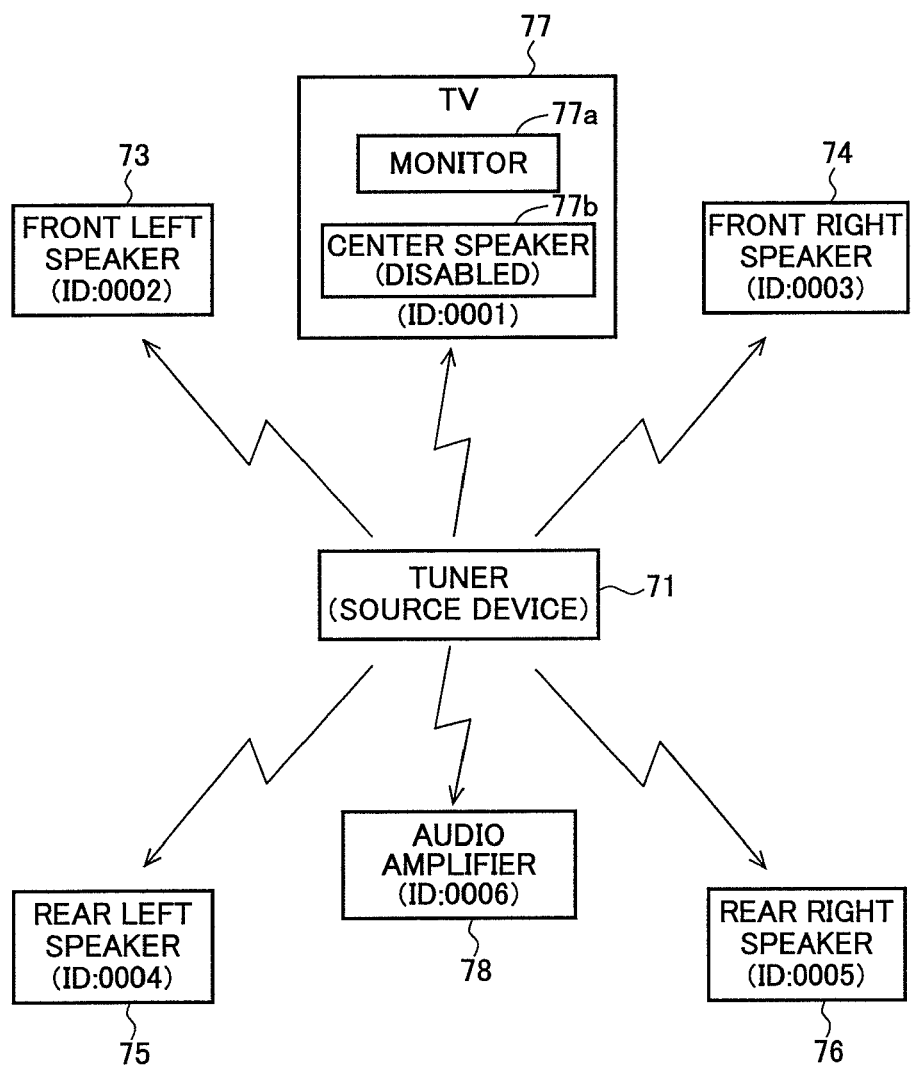
FIG. 10 is a diagram of another exemplary construction of the wireless transmission system of FIG. 1.
Figure 11:
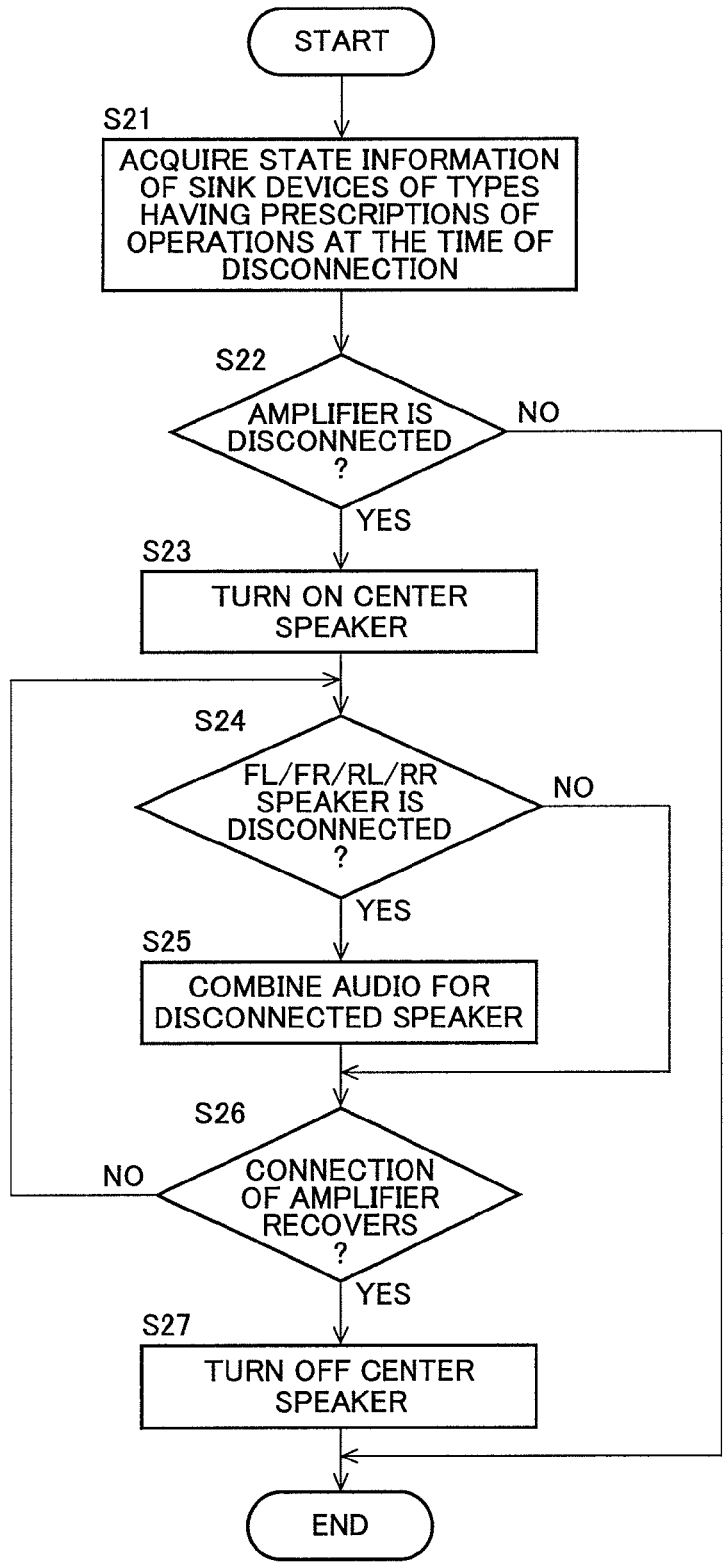
FIG. 11 is a flowchart for explaining an operational example of a TV in the wireless transmission system of FIG. 10.

FIG. 10 is a diagram of another exemplary construction of the wireless transmission system of FIG. 1 and FIG. 11 is a flowchart for explaining an operational example of a TV in the wireless transmission system of FIG. 10. In the system of FIG. 10, a TV 77 (ID: 0001) is disposed instead of the monitor 72 in the system of FIG. 8. The TV 77 has a monitor 77a and a center speaker 77b. It is assumed that the center speaker 77b is set to be disabled. If all the sink devices favorably communicate, a surround system can be made up of the speaker devices 73 to 76 and the audio amplifier 78.

If wireless transmission is disconnected between the audio amplifier 78 and the tuner 71 due to wireless disturbance in this system, other surround speaker devices 73 to 76 comprehend the wireless disconnection state of the audio amplifier 78 from the sink list of the source device 1 and may automatically adjust a sound balance and a sound volume level to compensate the absence thereof. Such a control is as described in FIGS. 8 and 9. A control example of compensating the absence of the audio amplifier 78 only with the center speaker 77b will be described. The following control is mainly performed by the sink operation control portion 28 of FIG. 6 with reference to the setup information storage portion 29 in the TV 77.

First, the TV 77 acquires the state information of sink devices of types having prescriptions of operations at the time of disconnection from an operation table like the operation table 29a of FIG. 7 from the source device 1 (step S21). In the case of this system, the operation table in the TV 77 is assumed to prescribe the operation related to an audio amplifier (corresponding to the amplifier 78) and the respective operations for front left, front right, rear left, and rear right speaker devices. The former operation is an operation of outputting main audio from the center speaker 77b when the audio amplifier is disconnected. The latter operations are assumed to be operations of outputting audio from the center speaker 77b in combination with an audio channel of a disconnected speaker device if disconnected while the audio amplifier is disconnected.

Following step S21, the TV 77 determines whether the audio amplifier 78 is disconnected (step S22), turns on the center speaker 77b to reproduce the main audio if YES (step S23), and terminates the process if NO. As a result of the process at steps S21 to S23, if the wireless transmission is disconnected between the audio amplifier 78 and the tuner 71 due to wireless disturbance, the TV 77 comprehends the wireless transmission status of the audio amplifier from the sink list of the tuner 71, automatically enables a built-in speaker (the center speaker 77b), and performs audio output from the built-in speaker. This can prevent an unsatisfactory viewing environment such as the termination of the main audio due to wireless disturbance.

Following step S23, the TV 77 determines whether any one of the front left, front right, rear left, and rear right speaker devices 73 to 76 is disconnected (step S24), and combines and outputs the main audio with the audio of the audio channel of the disconnected speaker device from the center speaker 77b (step S25).

Following step S25, the TV 77 waits for the timing of the sink list acquisition and determines whether the connection of the audio amplifier 78 recovers (restitutes) (step S26). If the connection recovers, the TV 77 turns off the center speaker 77b (step S27) and, if the connection does not recover, the TV 77 goes back to step S24. As described above, the process of steps S24 and S25 is a process executed only in the absence of the audio amplifier 78. The process of steps S21 to S27 may basically be executed each time the sink list is acquired. The determination and the process related to the recovery of the speaker devices 73 to 76 from disconnection will not be described.

Figure 12:
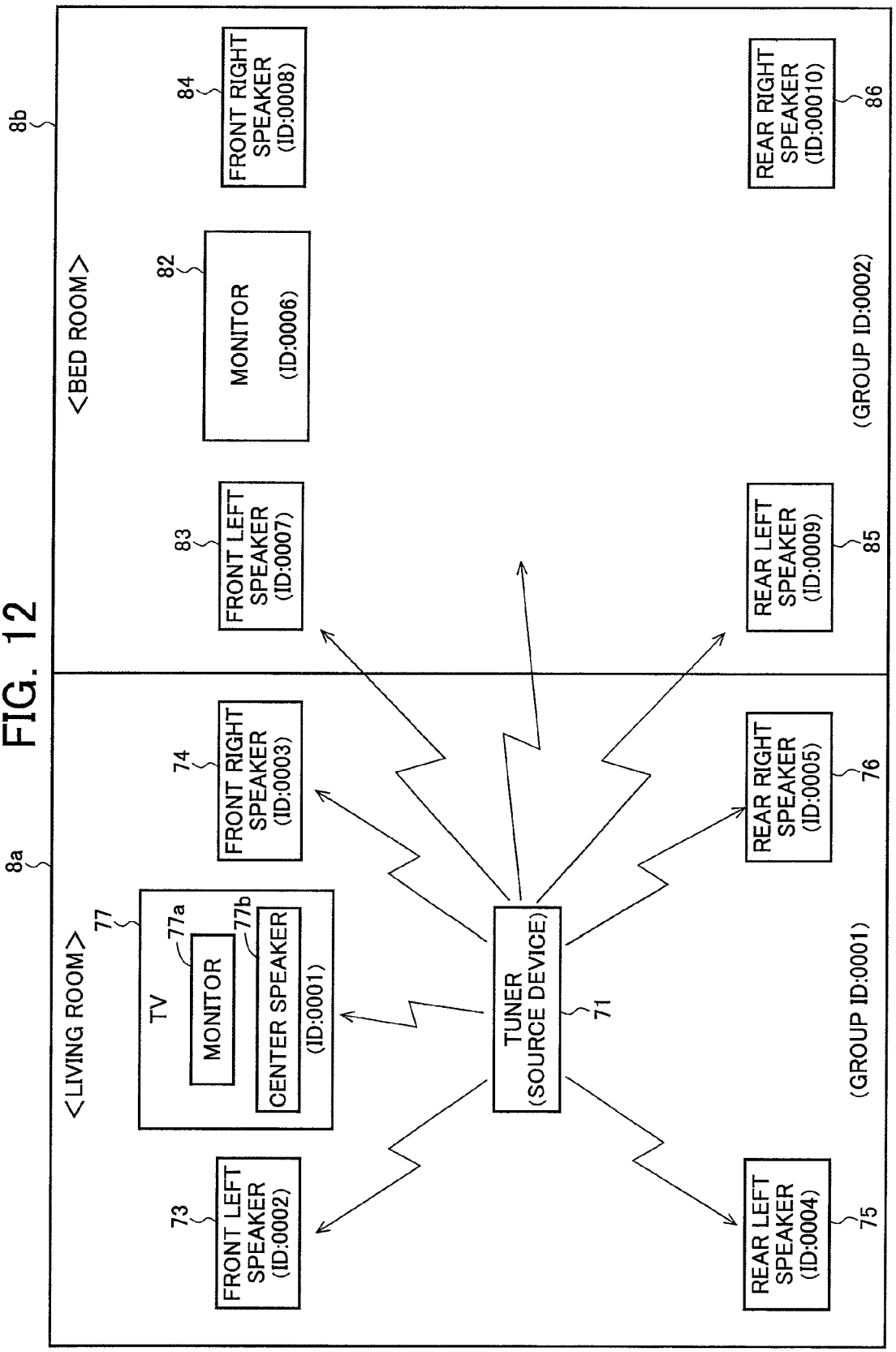
FIG. 12 is a diagram of another exemplary construction of the wireless transmission system of FIG. 1.
Figure 14:
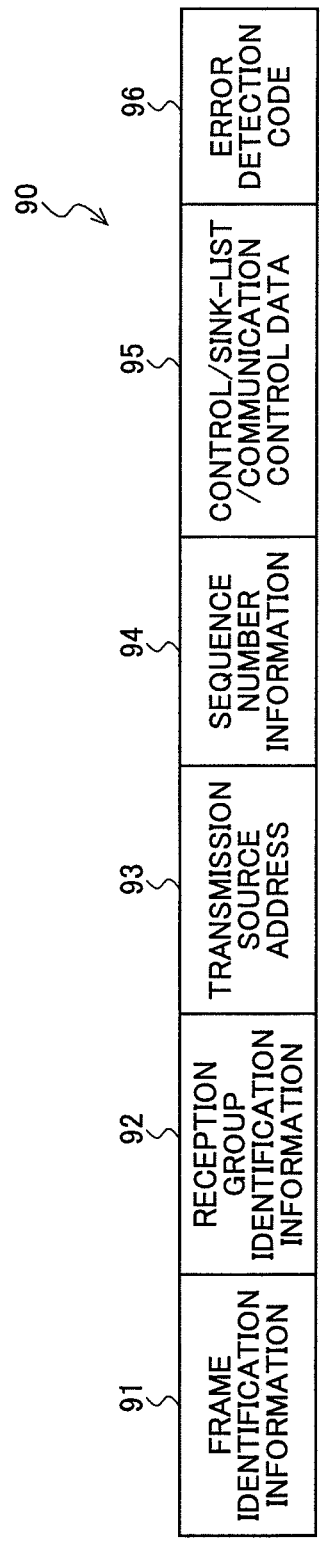
FIG. 14 is a diagram of an example of a format of a frame multicast-transmitted to a sink device belonging to a certain group from a source device in the wireless transmission system of FIG. 12.

FIG. 12 is a diagram of another exemplary construction of the wireless transmission system of FIG. 1. FIG. 13 is a diagram of an example of a sink list managed by a source device in the wireless transmission system of FIG. 12 and FIG. 14 is a diagram of an example of a format of a frame multicast-transmitted to a sink device belonging to a certain group from a source device in the wireless transmission system of FIG. 12.

In this example, a system providing a plurality of sets of viewing environment from one source device will be described. A system exemplarily illustrated in FIG. 12 is made up of the tuner 71 that is the source device and the sink devices 73 to 77 disposed in a living room 8a, and sink devices 82 to 86 disposed in a bed room 8b. The sink devices 73 to 77 of the living room 8a are the devices described in FIG. 8 or 10 and the sink devices 82 to 86 of the bed room 8b are devices respectively corresponding to 72 to 76 of FIG. 8.

In the case of the system providing a plurality of sets of viewing environment from one source device 1 as described above, the sink device information preferably has the identification information and the state information (and the type information) correlated with group identification information. In other words, the sink device information is preferably managed for a plurality of groups each consisting of a plurality of sink devices such that a sink device can determine the wireless connection states of other sink devices. The group identification information is information for identifying a group to which each of the sink devices 2 belongs. As is the case with the separation into the living room 8a and the bed room 8b in FIG. 12, sink devices fulfilling one function such as a plurality of surround speakers (a front left channel, a center channel, etc.) may be treated as one group, for example.

The sink list 11b exemplarily illustrated in FIG. 13 is managed by the sink list managing portion 11 as is the case with the sink list 11a of FIG. 3 and retains sink device identification IDs, sink device types, wireless connection states, and group identification IDs as respective data item examples of the identification information, the type information, the state information, and the group identification information. A group ID of FIG. 12 indicates a group of devices corresponding to the group identification ID in the sink list 11b of FIG. 13.

Although the sink list 11b including the group identification IDs as described above may be transmitted through the transmission frame 40 of FIG. 4, the sink list 11b is preferably transmitted through a frame for a certain group as exemplarily illustrated by a transmission frame 90 of FIG. 14. The transmission frame 90 is a frame multicast-transmitted for control/list notification to a certain group. The transmission frame 90 is made up of fields such as frame identification information 91, reception group identification information 92, a transmission source address 93, sequence number information 94, control/sink-list/communication control data 95, and an error detection code 96.

The frame identification information 91, the transmission source address 93, the sequence number information 94, and the error detection code 96 are as described with the transmission frame 40 of FIG. 4. The reception group identification information 92 is information specifying a receiving group. A sink device receives the subsequent fields of the transmission frame 90 based on this information if identical to its own group. The control/sink-list/communication control data 95 includes control data, a sink list (including the state information), and communication control data (communication control data is necessary if management of network formation etc., are performed). This sink list is a sink list for the sink devices 2 belonging to the certain group.

In such a system, the reproducing portion also provides the reproduction control depending on the state information (and the type information and the channel information). However, for example, the living room 8a and the bed room 8b respectively form separate viewing environments in such a grouped system and, therefore, the reproducing portion preferably provides the reproduction control in accordance with the state information (and the type information and the channel information) of other sink devices belonging to the same group received by the device information receiving portion. When the sink devices operate in an interlocking manner in each viewing environment of a plurality of different viewing environments, a failure of one viewing environment can be prevented from affecting the other viewing environment.

Figure 15:
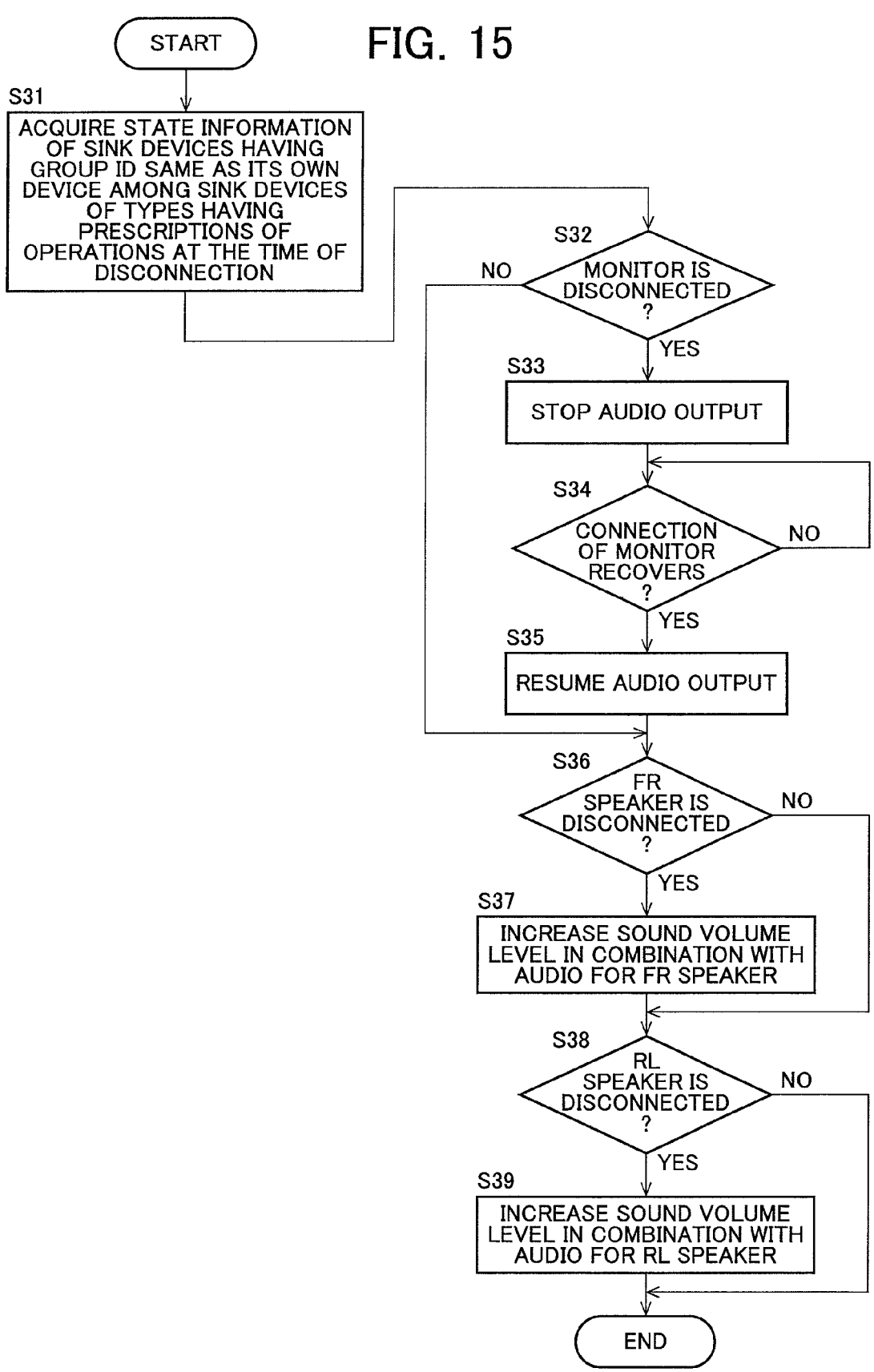
FIG. 15 is a flowchart for explaining an operational example of a front left speaker disposed in a bed room in the wireless transmission system of FIG. 12.

FIG. 15 is a flowchart for explaining an operational example of the front left speaker disposed in the bed room in the wireless transmission system of FIG. 12. Although an operational example of the front left speaker device 83 of the group identification ID 0002 (in the bed room 8b) will be mainly described with reference to FIG. 15, other sink devices belonging to the same group also perform operations tailored to the functions of the devices in the same way. Other sink devices belonging to another group (in the living room 8a) operate independently of the sink devices of this group (in the bedroom 8b). The following control is mainly performed by the sink operation control portion 28 of FIG. 6 with reference to the setup information storage portion 29 in the speaker device 83.

First, the front left speaker device 83 acquires the state information of sink devices having the group identification ID same as the front left speaker device 83 among other sink devices of types having prescriptions of operations at the time of disconnection from an operation table like the operation table 29a of FIG. 7 from the source device 1 (step S31). In the case of this system, the operation table in the front left speaker device 83 is assumed to prescribe the operation related to the monitor in the operation table 29a, the operation of increasing a sound volume level in combination with audio of a channel for a front right speaker device (corresponding to the device 84) at the time of disconnection of the front right speaker device, and the operation of increasing a sound volume level in combination with audio of a channel for a rear left speaker device (corresponding to the device 85) at the time of disconnection of the rear left speaker device. Although the operations at the time of disconnection are obviously not prescribed for the sink devices 73 to 77 of the different group, it is also assumed that the operation at the time of disconnection of a rear right speaker device (corresponding to the device 86) is not prescribed in the following description.

The front left speaker device 83 executes the process same as steps S2 to S9 of FIG. 9 (steps S32 to S39). However, the determination of disconnection at steps S32, S34, S36, and S38 is made based on the state information for the group identification ID (0002) same as the front left speaker device 83.

An embodiment employing the control command described in FIG. 4 will be described with reference to FIGS. 2, 3, 6, 7, etc., as needed. Although this control command may not be employed as can be seen from the examples described above, if employed, a plurality of sink devices can be controlled by one sink device (one sink device for each group if separated into groups).

The primary (master) sink device 2 in this form includes a control command transmitting portion generating a control command related to the reproduction control to be executed by other sink devices 2 (i.e., secondary sink devices 2) concurrently with the reproduction control depending on the state information etc., provided by the reproducing portion to wirelessly transmit the control command to the source device 1. The control commands corresponding to the sink device types may be stored in the setup information storage portion 29 in a correlated manner with the reproduction control depending on the state information, etc., (e.g., operations in the operation table 29a of FIG. 7) and may be read out to generate the control command. For example, the control commands may be written next to the operations in the operation table 29a. The control commands are commands indicative of the contents to be actually executed by the secondary (slave) sink devices 2, such as "reproducing with increased sound volume level", "shifting to standby state", or "returning from standby state", for example. The control command transmitting portion can exemplarily be illustrated by the elements 21, 22, 24, 26, 28, and 29 of FIG. 6.

The source device 1 in this form includes a receiving portion that receives the control command transmitted by the control command transmitting portion of the master sink device 2. This receiving portion can exemplarily be illustrated by the elements 18, 17, 15, 13, etc., of FIG. 2. The source device 1 also includes a command registering portion registering the control commands for the sink devices received by the receiving portion as a portion of the sink device information (sink list) in a correlated manner with the identification information. The command registering portion can exemplarily be illustrated by the sink list managing portion 11 of FIG. 2. This enables the sink list managing portion 11 to manage a sink list including the control commands for the slave sink devices 2.

In a configuration where the control commands of the master sink device are transmitted through direct wireless transfer to the slave sink devices, the control commands may be implemented so as not to be included in the sink list if all the wireless connection states are favorable in the system. However, in general, although the communication status is good between a source device and a sink device in a star network, the communication status may not be good in the communication between sinks depending on arrangement and, therefore, the control commands are more certainly transferred to the slave sink devices by the multicast transmission via the source device than by the transmission between sinks as in this system. Since the control commands are included and registered in the sink list multicast-transmitted by the source device in this system, a sink device can acquire the control commands at arbitrary timing by receiving the sink list and, therefore, if the multicast transmission including the control commands is failed to be received once, the commands can be executed by subsequently acquiring the sink list. This is effective in the control command specifying a state such as "standby/activation state" and "sound volume level". If the wireless connection state of the mater sink device 2 turns to disconnection, the command registering portion may exceptionally register a reproduction termination command as the control command. The control of the slave sink devices 2 based on this reproduction termination command may simply be performed by terminating reproduction as described at step S3 of FIG. 9. This enables the response to the disconnection of the master sink device 2.

The reproducing portions of the slave sink devices 2 in this form may perform reproduction in accordance with the control commands received by the device information receiving portions. For example, if the control command is a command for increasing a sound volume level, the audio output devices among the slave sink devices 2 may increase a sound volume level in accordance with the control command. It is particularly preferred that the reproducing portion performs the reproduction in accordance with the control command in preference to the reproduction control depending on the state information etc.

The form related to the control command is applicable regardless of whether the sink devices 2 are grouped. Particularly if grouped, the control commands can be stored for each group and, therefore, the control can be provided for each group.

If the wireless transmission system is constructed of the (basically one) master sink device, the (one or more) slave sink devices, and the source device retaining the control commands in the sink list in this way, the master sink device can control the slave sink device. The slave sink devices can achieve the same more balanced control in view of the whole system by providing the reproduction control in accordance with the control commands without directly providing the reproduction control depending on the state information etc., as described above.

Although the examples are described by reference to sink devices having disposition locations specified in advance such as a speaker device specified as a right speaker device, a type of each sink device may be registerable in the source device at the time of setup of the wireless communication (unicast wireless transmission) etc.

Although the description is made of the operation from the state with the operation table already set, the operation table may be configured to be acquired through wireless transmission from the source device and the other sink devices at the activation of the sink device.

An example of the source device capable of comprehending the reproduction control states of the sink devices will be described.

Figure 16:
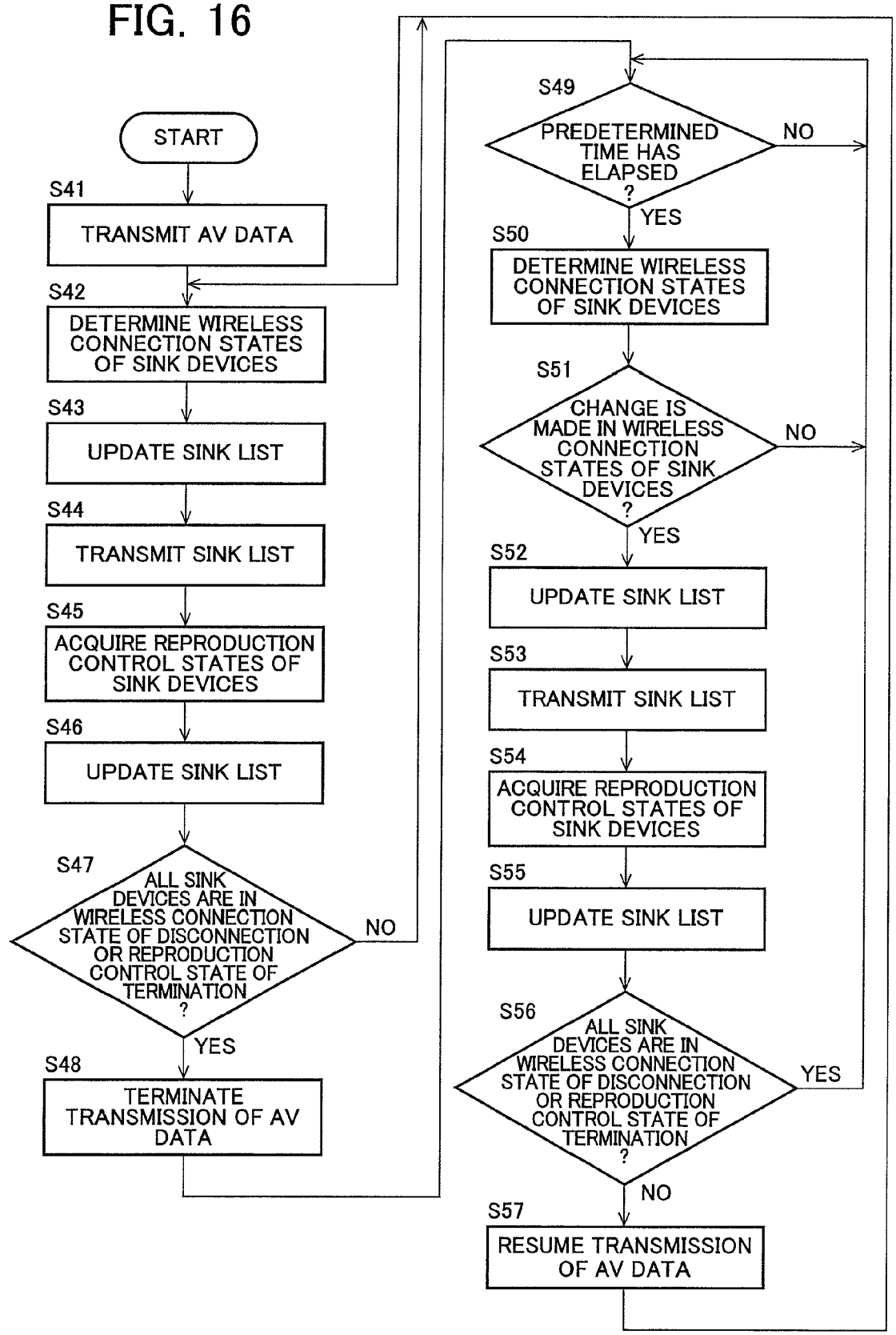
FIG. 16 is a flowchart for explaining an operational example of the source device.

FIG. 16 is a flowchart for explaining an operational example of the source device.

First, it is assumed that the source device 1 is in the state of multicast wireless transmission of AV data (step S41). In this state, the source device 1 determines the wireless connection states of the sink devices 2 (step S42). As described above, this determination may be made by periodically performing wireless communication from the source device 1 to the sink devices and determining that the sink device 2 not returning a response is unconnected (disconnected) or that the sink device 2 is unconnected (disconnected) depending on a device operating state causing a reproduction failure other than the reception state and the wireless transmission.

After determining the wireless connection states of the sink devices at step S42, the source device updates a sink list depending on the determined wireless connection states of the sink devices (step S43). For the sink list used by the source device 1, it is desirable to use a list acquired by adding information indicative of the reproduction control states of the sink devices to the sink list 11a depicted in FIG. 3 as in a sink list 11c depicted in FIG. 17. Alternatively, the sink list depicted in FIG. 3 may be used along with a separate list correlating the sink device identification IDs with the reproduction control states. In the following description, it is assumed to use the sink list 11c depicted in FIG. 17.

Following step S43, the source device 1 transmits the sink list to the sink devices 2 (step S44). In this case, the contents of the sink list transmitted to the sink devices may not be those of the sink list 11c depicted in FIG. 17 and may be those of the sink list 11a depicted in FIG. 3 without the reproduction control states. The sink list may periodically be transmitted by the source device 1 or may be transmitted in response to a request from the sink devices 2.

Each of the sink devices 2 receives the sink list and provides the reproduction control of AV data depending on the state information indicative of the wireless connection states of other sink devices as described above. In this state, the source device 1 comprehends the reproduction control states in the sink devices 2 (step S45). More specifically, the source device 1 may request information indicative of the reproduction control states from the sink devices 2 or each of the sink devices 2 may be configured to transmit the information indicative of the reproduction control state to the source device 2 when a change is made in the reproduction control state of the sink device 2. The information indicative of the reproduction control state is, for example, "normal reproduction", "reproduction with increased output", and "termination", and is information indicative of a type of reproduction control in accordance with the operations defined in the operation table 29a depicted in FIG. 7.

The source device 1 updates the sink list 11c and registers the reproduction control states of the sink devices acquired at step S45 to the sink list 11c (step S46). The source device 1 determines whether all the sink devices are in the wireless connection state of disconnection or the reproduction control state of termination (step S47). If not all the sink devices are in the wireless connection state of disconnection or the reproduction control state of termination at step S47, the source device 1 returns to step S42 to continue the multicast wireless transmission of AV data.

If all the sink devices are in the wireless connection state of disconnection or the reproduction control state of termination at step S47, the source device 1 goes to step S48 to terminate the transmission of AV data. As exemplarily illustrated by the sink list of FIG. 17, such a state corresponds to the case that both the TV and the monitor are in the wireless connection state of disconnection while the respective operation tables of the audio amplifier, the L speaker, and the R speaker are set such that the reproduction of AV data is terminated if both the TV and the monitor are in the wireless connection state of disconnection.

After the transmission of AV data is terminated at step S48, the source device 1 goes to step S49 and, after a predetermined time has elapsed, the source device 1 determines the wireless connection states of the sink devices 2 (step S50) and further determines whether a change is made in the wireless connection states of the sink devices (step S51).

If no change is made at step S51, the source device 1 returns to step 49 and repeats the subsequent operation. If a change is made at step S51, the source device 1 updates the sink list 11c (step S52) and transmits the information of the updated sink list to the sink devices 2 (53). The source device 1 then acquires the information of the reproduction control states of the sink devices 2 (step S54) and updates the sink list (step S55).

At step S56, the source device 1 determines whether all the sink devices are in the wireless connection state of disconnection or the reproduction control state of termination. If all the sink devices are in the wireless connection state of disconnection or the reproduction control state of termination at step S56, the source device 1 returns to step S49 and repeats the subsequent steps. If not all the sink devices are in the wireless connection state of disconnection or the reproduction control state of termination at step S56, the source device 1 resumes the transmission of AV data (step S57) and subsequently returns to step S42.

Since the source device 1 can comprehend the reproduction control states of AV data in the sink devices as described above, the transmission of AV data from the source device 1 can be controlled in accordance with the wireless connection states. As described above, even when the source device 1 transmits AV data, if the system cannot perform reproduction, the transmission of AV data is terminated and, when the sink device 2 capable of reproduction comes to exist, the transmission of AV data can be resumed. Therefore, for example, even if the wireless connection state deteriorates while this wireless transmission system is used for watching a movie etc., from a recorder, since the reproduction is automatically terminated and then resumed when the wireless connection state becomes favorable, one can watch the movie etc., without interruption of the story.

EXPLANATIONS OF LETTERS OR NUMERALS

1 ... source device; 2a, 2b, 2 ... sink device; 11 ... sink list managing portion; 11a, 11b, 11c ... sink list; 12 ... video audio generating portion; 13 ... wireless communication control portion; 14 ... transmission data combining portion; 15, 23 ... reception signal data demodulating portion; 16, 24 ... transmission data signal modulating portion; 17, 22 ... analogue signal processing portion; 18, 21 ... antenna; 25 ... reception data separating portion; 26 ... wireless communication control portion; 27 ... audio separating/combining portion; 28 ... sink operation control portion; 29 ... setup information storage portion; 29a ... operation table; 30 ... audio output portion; and 31 ... operation input portion.

The invention claimed is:

1. A sink device having an AV receiving portion for receive AV data including video and/or audio that are output through multicast wireless transmission from a source device, the sink device further comprising:

a reproducing portion for extracting and reproducing AV data transmitted to the sink device from the AV data received by the AV receiving portion; a device information receiving portion for receiving a part of or the whole sink device information from the source device by wireless, the sink device information being information correlating identification information for identifying a plurality of sink devices including the sink device with state information indicative of wireless connection states of the sink devices; and a transmitting portion for transmitting a reproduction control state of the sink device to the source device, wherein the reproducing portion executes a reproduction control in accordance with the state information about other sink devices received by the device information receiving portion, and the transmitting portion transmits information indicating the reproduction control state to the source device.

2. The sink device as defined in claim 1, wherein the transmitting portion transmits the information indicating the reproduction control state to the source device when a change occurs in the reproduction control state.

3. The sink device as defined in claim 1, wherein the transmitting portion transmits the information indicating the reproduction control state to the source device when requested from the source device.

4. A source device having an AV transmitting portion for transmitting AV data including video and/or audio to sink devices through multicast wireless transmission, the source device further comprising:

a connection state determining portion for determining a wireless connection state for each of a plurality of sink devices;

a device information storage portion for correlating identification information preliminarily registered for identifying each of the plurality of sink devices with state information indicating wireless connection states of the sink devices determined by the connection state determining portion and storing as sink device information;

a device information transmitting portion for wirelessly transmitting the sink device information stored by the device information storage portion; and a receiving portion for receiving information indicating reproduction control states of sink devices transmitted from the sink devices.

5. The source device as defined in claim 4, wherein if all the sink devices are in the wireless connection state of disconnection or the reproduction control state of termination, the transmission of the AV data is terminated.

6. The source device as defined in claim 5, wherein the information indicating the reproduction control states is received by sending a request to the sink devices.

7. The source device as defined in claim 5, wherein in the sink device information, the identification information is correlated with the information indicative of the reproduction control states.

8. The source device as defined in claim 5, wherein when a predetermined time has elapsed after the termination of the transmission of the AV data, a wireless connection state is determined for each of the plurality of sink devices to update the sink device information, and information indicating the reproduction control states is acquired from the sink devices after the updated sink device information is transmitted to the sink devices.

9. The source device as defined in claim 8, wherein the information indicating the reproduction control states is received by sending a request to the sink devices.

10. The source device as defined in claim 8, wherein in the sink device information, the identification information is correlated with the information indicative of the reproduction control states.

11. The source device as defined in claim 8, wherein if the information indicating the reproduction control states of at least one of the sink devices does not indicate termination, the transmission of the AV data is resumed.

12. The source device as defined in claim 11, wherein the information indicating the reproduction control states is received by sending a request to the sink devices.

13. The source device as defined in claim 11, wherein in the sink device information, the identification information is correlated with the information indicative of the reproduction control states.

14. The source device as defined in claim 4, wherein the information indicating the reproduction control states is received by sending a request to the sink devices.

15. The source device as defined in claim 4, wherein in the sink device information, the identification information is correlated with the information indicative of the reproduction control states.

16. A wireless transmission system comprising: a plurality of sink devices each sink device having an AV receiving portion for receiving AV data including video and/or audio that are output through multicast wireless transmission from a source device, each sink device further comprising a reproducing portion for extracting and reproducing AV data transmitted to the sink device from the AV data received by the AV receiving portion; a device information receiving portion for receiving a part of or the whole sink device information from the source device by wireless, the sink device information being information correlating identification information for identifying a plurality of sink devices including the sink device with state information indicative of wireless connection states of the sink devices; and a transmitting portion for transmitting a reproduction control state of the sink device to the source device, wherein the reproducing portion executes a reproduction control in accordance with the state information about other sink devices received by the device information receiving portion, and the transmitting portion transmits information indicating the reproduction control state to the source device; and claim 4.

* * * * *